US012644418B1

(12) United States Patent
Xu

(10) Patent No.: US 12,644,418 B1
(45) Date of Patent: Jun. 2, 2026

(54) SELF-SACRIFICE BATTERY FOR STARTER IGNITION OF SMALL ENGINES

(71) Applicant: RTX Corporation, Farmington, CT (US)

(72) Inventor: JinQuan Xu, East Greenwich, RI (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/257,893

(22) Filed: Jul. 2, 2025

(51) Int. Cl.
| | |
|---|---|
| *F02C 7/272* | (2006.01) |
| *F02C 7/22* | (2006.01) |
| *F02C 7/264* | (2006.01) |
| *F01D 19/00* | (2006.01) |

(52) U.S. Cl.
CPC .............. *F02C 7/272* (2013.01); *F02C 7/222* (2013.01); *F02C 7/264* (2013.01); *F01D 19/00* (2013.01); *F05D 2260/85* (2013.01); *F05D 2260/99* (2013.01)

(58) Field of Classification Search
CPC .......... F02C 7/272; F02C 7/222; F02C 7/264; F01D 19/00; F05D 2260/85; F05D 2260/99
See application file for complete search history.

(56) References Cited

U.S. PATENT DOCUMENTS

| | | | | |
|---|---|---|---|---|
| 4,651,952 | A | * | 3/1987 | Tavano .................. B64D 25/08 244/140 |
| 11,658,363 | B2 | | 5/2023 | Roethinger et al. |
| 2010/0326086 | A1 | * | 12/2010 | Khosid .................. F02C 7/272 60/778 |
| 2020/0339010 | A1 | * | 10/2020 | Villanueva ................ B64F 1/36 |

* cited by examiner

*Primary Examiner* — Phutthiwat Wongwian
*Assistant Examiner* — Rene D Ford
(74) *Attorney, Agent, or Firm* — Bachman & LaPointe, P.C.

(57) ABSTRACT

A start mechanism for a propulsion system including a receptacle; at least one portable source of energy disposed within the receptacle; a flow channel fluidly coupled to the receptacle; and a combustion section within the case, the combustion section fluidly coupled to the flow channel; wherein the at least one portable source of energy is configured to produce at least one of electrical energy and a source of chemical energy.

19 Claims, 5 Drawing Sheets

SELF-SACRIFICE BATTERY FOR STARTER IGNITION OF SMALL ENGINES

BACKGROUND

The present disclosure is directed to the improved start mechanism for small engines.

For a prior art small engine E as shown in FIG. 1, the gas turbine engine E requires a charge of compressed air or rapidly expanding gas to initially start the gas turbine engine E. The initial charge of compressed air requires a portable volume of air to start the engine or an expensive pyrotechnic start cartridge gas generator. This volume is conventionally held in a separate pressure vessel (cartridge) V attached to the small engine E. The separate pressure vessel (cartridge) V adds weight, cost and part count to the small engine design.

Moreover, the small engine E employs pyrotechnic cartridges as a way of starting the engine E. Supply chain issues with pyrotechnic ignitors and starter cartridges are causing an industry wide problem.

SUMMARY

In accordance with the present disclosure, there is provided a start mechanism for a propulsion system comprising a receptacle; at least one portable source of energy disposed within the receptacle; a flow channel fluidly coupled to the receptacle; and a combustion section within a case, the combustion section fluidly coupled to the flow channel; wherein the at least one portable source of energy is configured to produce at least one of electrical energy and a source of chemical energy.

A further embodiment of any of the foregoing embodiments may additionally and/or alternatively include the at least one portable source of energy is a battery.

A further embodiment of any of the foregoing embodiments may additionally and/or alternatively include the battery is selected from the group comprising lithium cobalt oxide (LCO), nickel manganese cobalt (NMC), LCO/NMC, lithium iron phosphate (LFP), lithium manganese oxide (LMO), lithium titanate oxide (LTO), LTO-NMC, nickel cobalt aluminum (NCA), NMC/LMO, and combinations thereof.

A further embodiment of any of the foregoing embodiments may additionally and/or alternatively include the at least one portable source of energy is configured after initiation to produce a converted chemical energy.

A further embodiment of any of the foregoing embodiments may additionally and/or alternatively include the converted chemical energy comprises an ignition fluid.

A further embodiment of any of the foregoing embodiments may additionally and/or alternatively include the at least one portable source of energy is configured to be initiated by at least one of being overheated, crushed, penetrated to expose air to a source of chemical energy, overcharged electrically, internally shorted, mixed with multiple chemicals and combinations thereof.

A further embodiment of any of the foregoing embodiments may additionally and/or alternatively include the flow channel is insulated.

In accordance with the present disclosure, there is provided a gas turbine engine having a start mechanism comprising a case supporting a combustion section having a combustor; a receptacle in operative communication with the combustor; at least one battery disposed within the receptacle; a flow channel fluidly coupled to the receptacle;

the combustor fluidly coupled to the flow channel; wherein the at least one battery is configured to produce at least one of electrical energy and a source of chemical energy; wherein the source of chemical energy is configured, after initiation, to produce a converted chemical energy, wherein the converted chemical energy comprises an ignition fluid.

A further embodiment of any of the foregoing embodiments may additionally and/or alternatively include the gas turbine engine having the start mechanism further comprising a first battery pack proximate the combustor, the first battery pack configured to ignite a fuel in the combustor; and a second battery pack coupled with a motor-generator, wherein the second battery pack is sized from 10× to 50× the Watt-hours of the first battery pack.

A further embodiment of any of the foregoing embodiments may additionally and/or alternatively include the flow channel comprises at least one of a fuse, a wick and a match configured to ignite a fuel and air in the combustor.

A further embodiment of any of the foregoing embodiments may additionally and/or alternatively include the flow channel comprises insulation, the insulation configured to manage thermal energy transfer.

A further embodiment of any of the foregoing embodiments may additionally and/or alternatively include the gas turbine engine having the start mechanism further comprising a motor-generator in operative communication with the at least one battery, wherein the at least one battery contains stored electrical energy for use to electrically spin the motor-generator to spool up a rotor of the gas turbine engine.

A further embodiment of any of the foregoing embodiments may additionally and/or alternatively include the flow channel is fluidly coupled with a diffuser, the diffuser configured to direct the ignition fluid toward a burner in the combustor.

In accordance with the present disclosure, there is provided a process of forming a gas turbine engine having a start mechanism comprising forming a case supporting a combustion section having a combustor; forming a receptacle in operative communication with the combustor; disposing at least one battery within the receptacle; forming a flow channel fluidly coupled to the receptacle; fluidly coupling the combustion section to the flow channel; configuring the at least one battery to produce at least one of electrical energy and a source of chemical energy; and configuring the source of chemical energy, after initiation, to produce a converted chemical energy, wherein the converted chemical energy comprises an ignition fluid.

A further embodiment of any of the foregoing embodiments may additionally and/or alternatively include the process further comprising forming a shell layer with the receptacle; configuring the shell layer to provide a resistive barrier between a receptacle interior and a receptacle exterior; and configuring the shell layer to provide at least one of a pressure barrier, a thermal barrier, an electrical barrier and a chemical barrier and combinations thereof.

A further embodiment of any of the foregoing embodiments may additionally and/or alternatively include the process further comprising coupling a motor-generator in operative communication with the at least one battery, wherein the at least one battery contains stored electrical energy for use to electrically spin the motor-generator to spool up a rotor of the gas turbine engine.

A further embodiment of any of the foregoing embodiments may additionally and/or alternatively include the process further comprising forming the flow channel comprising insulation; and configuring the insulation to manage thermal energy transfer.

A further embodiment of any of the foregoing embodiments may additionally and/or alternatively include the process further comprising coupling a first battery pack proximate the combustor, the first battery pack configured to ignite a fuel in the combustor; and coupling a second battery pack with a motor-generator, wherein the second battery pack is sized from 10× to 50× the Watt-hours of the first battery pack.

A further embodiment of any of the foregoing embodiments may additionally and/or alternatively include the process further comprising fluidly coupling the flow channel with a diffuser; and configuring the diffuser to direct the ignition fluid toward the combustor.

A further embodiment of any of the foregoing embodiments may additionally and/or alternatively include the at least one battery is selected from the group comprising lithium cobalt oxide (LCO), nickel manganese cobalt (NMC), LCO/NMC, lithium iron phosphate (LFP), lithium manganese oxide (LMO), lithium titanate oxide (LTO), LTO-NMC, nickel cobalt aluminum (NCA), NMC/LMO, and combinations thereof.

Other details of the start mechanism for small engines are set forth in the following detailed description and the accompanying drawings wherein like reference numerals depict like elements.

BRIEF DESCRIPTION OF THE DRAWINGS

The above and further advantages of this disclosure may be better understood by referring to the following description in conjunction with the accompanying drawings, in which like reference numerals indicate like elements and features in the various figures. Letters may be appended to reference numbers to distinguish from reference numbers for similar features and to indicate a correspondence to other features in the drawings. The embodiments shown in the individual figures are not limiting and can be combined to reflect a blended concept. For clarity, not every element may be labeled in every figure. The drawings are not necessarily to scale, emphasis instead being placed upon illustrating the principles of the disclosure.

DETAILED DESCRIPTION

Figure 1:
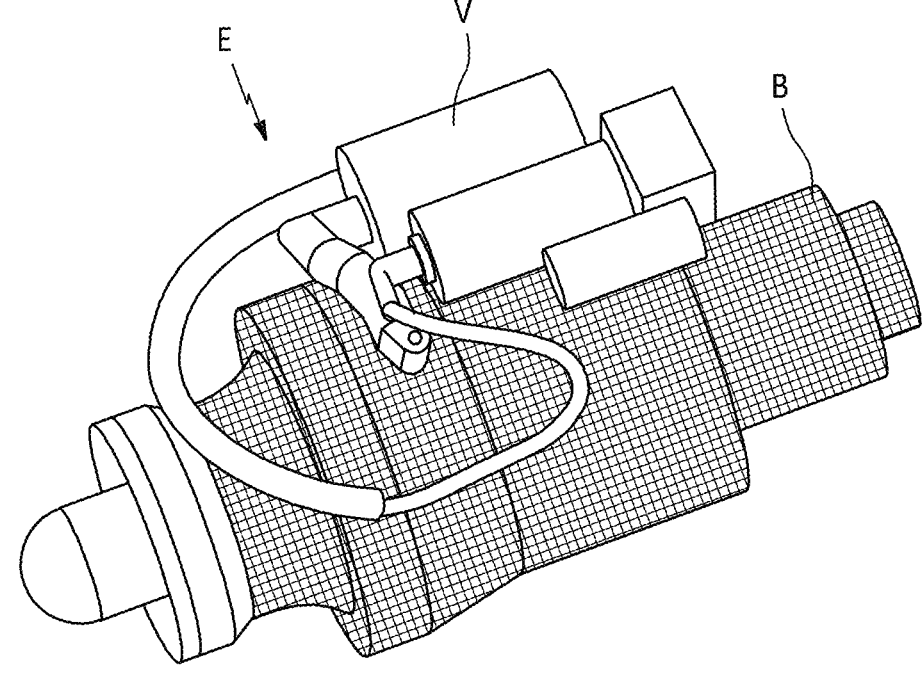
FIG. 1 is an isometric view of a schematic representation of a prior art gas turbine engine.
Figure 2:
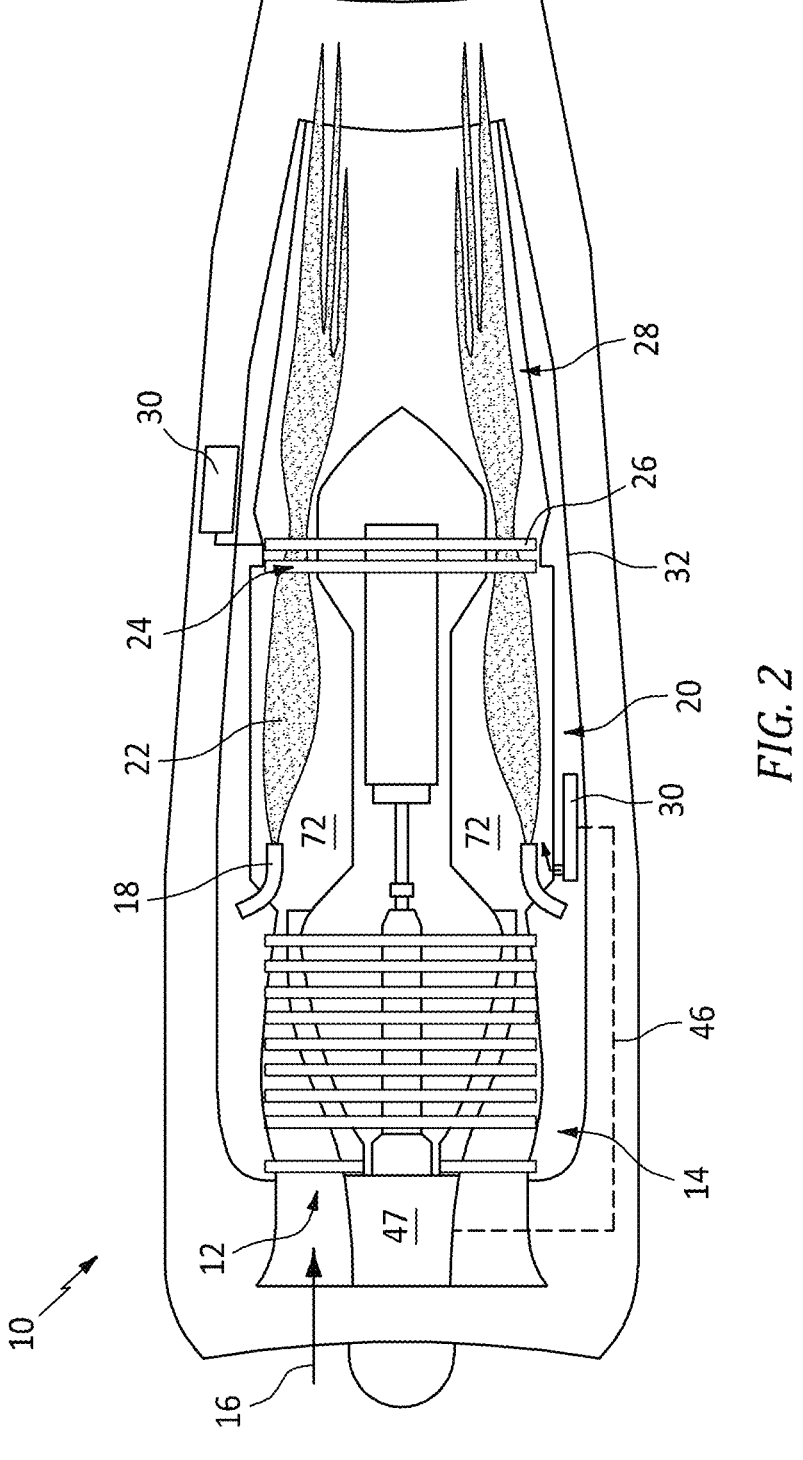
FIG. 2 is a cross sectional view schematic representation of an exemplary gas turbine engine.

Referring now to FIG. 2, there is illustrated an exemplary gas turbine engine, specifically a turbojet engine 10. The gas turbine engine 10 includes an inlet section 12 upstream of a compressor section 14 where air 16 is drawn in and compressed. Fuel 18 is injected into a combustion section 20 downstream of the compressor section 14. The air 16 is mixed with fuel 18 and burned in the combustion section 20. The combusted fuel 18 and air 16 are combined into a highly energized combustion product 22 (products of combustion 22) that expands through a turbine section 24. The products of combustion 22 move downstream over turbine rotors 26, driving the turbine rotors 26 to rotate creating rotary power. The products of combustion 22 move downstream and exit the turbine section 24 to the exhaust nozzle section 28 where engine thrust is developed for propulsion. The engine 10 may also include a generator 47 such as an anterior-mounted, permanent magnet generator (PMG). The generator 47 may operate in two modes, one as a generator to generate electricity, the other as a motor to spin the turbine 24 to spool up the engine 10 for starting the engine 10.

Figure 3:
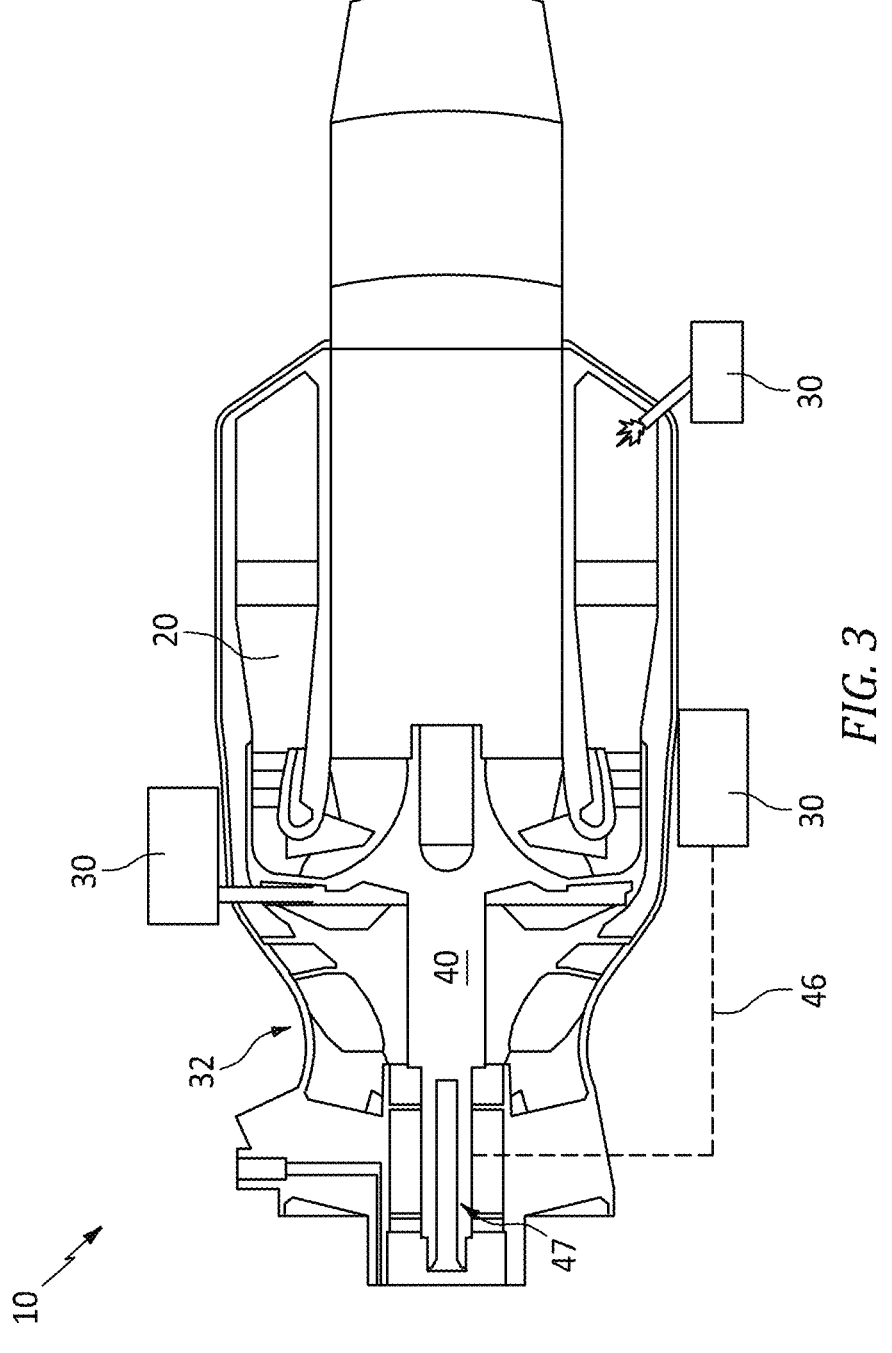
FIG. 3 is a partial cross sectional view schematic representation of an exemplary gas turbine engine.
Figure 4:
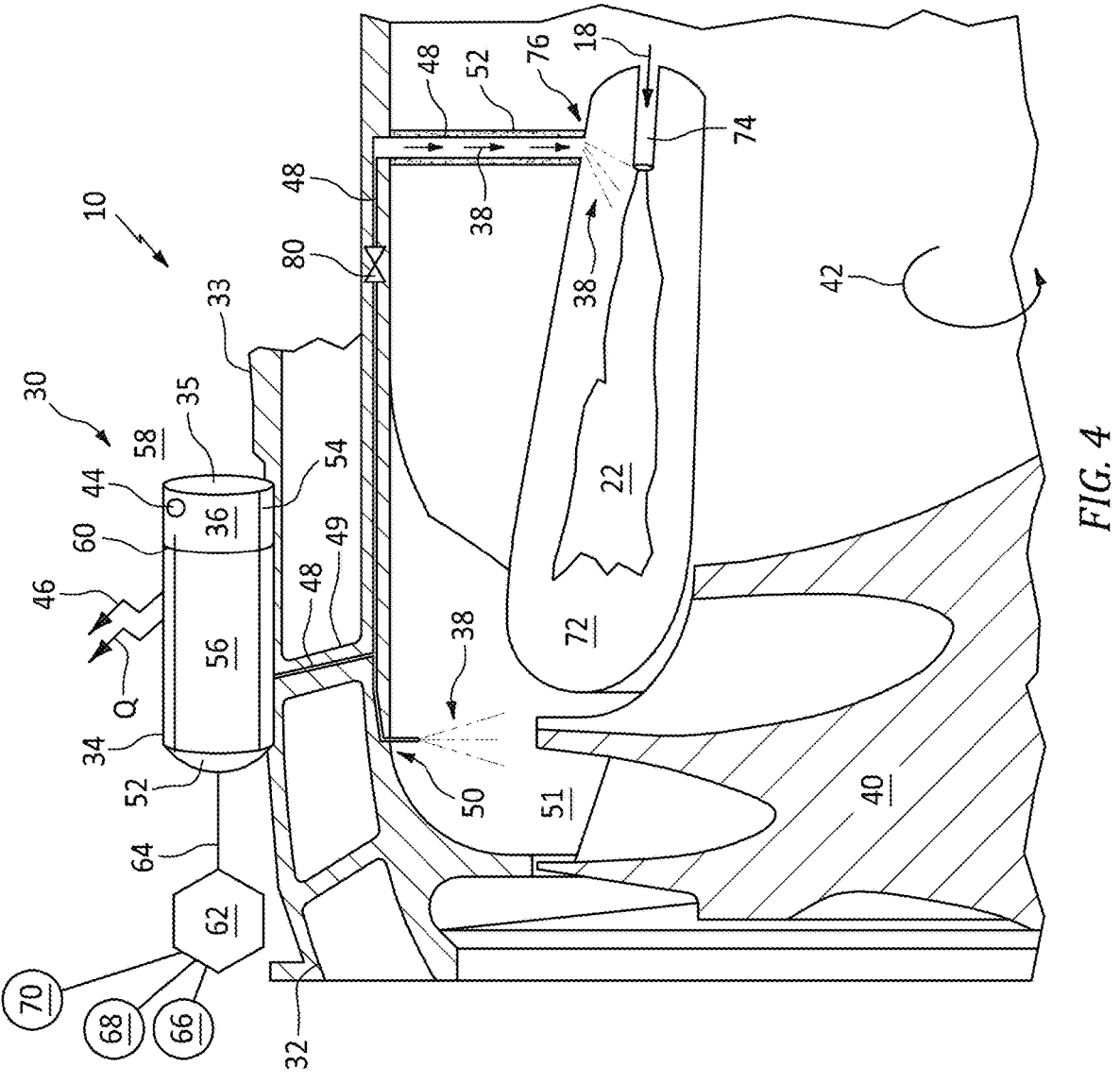
FIG. 4 is a partial cross sectional view schematic representation of an exemplary gas turbine engine with exemplary start mechanism.
Figure 5:
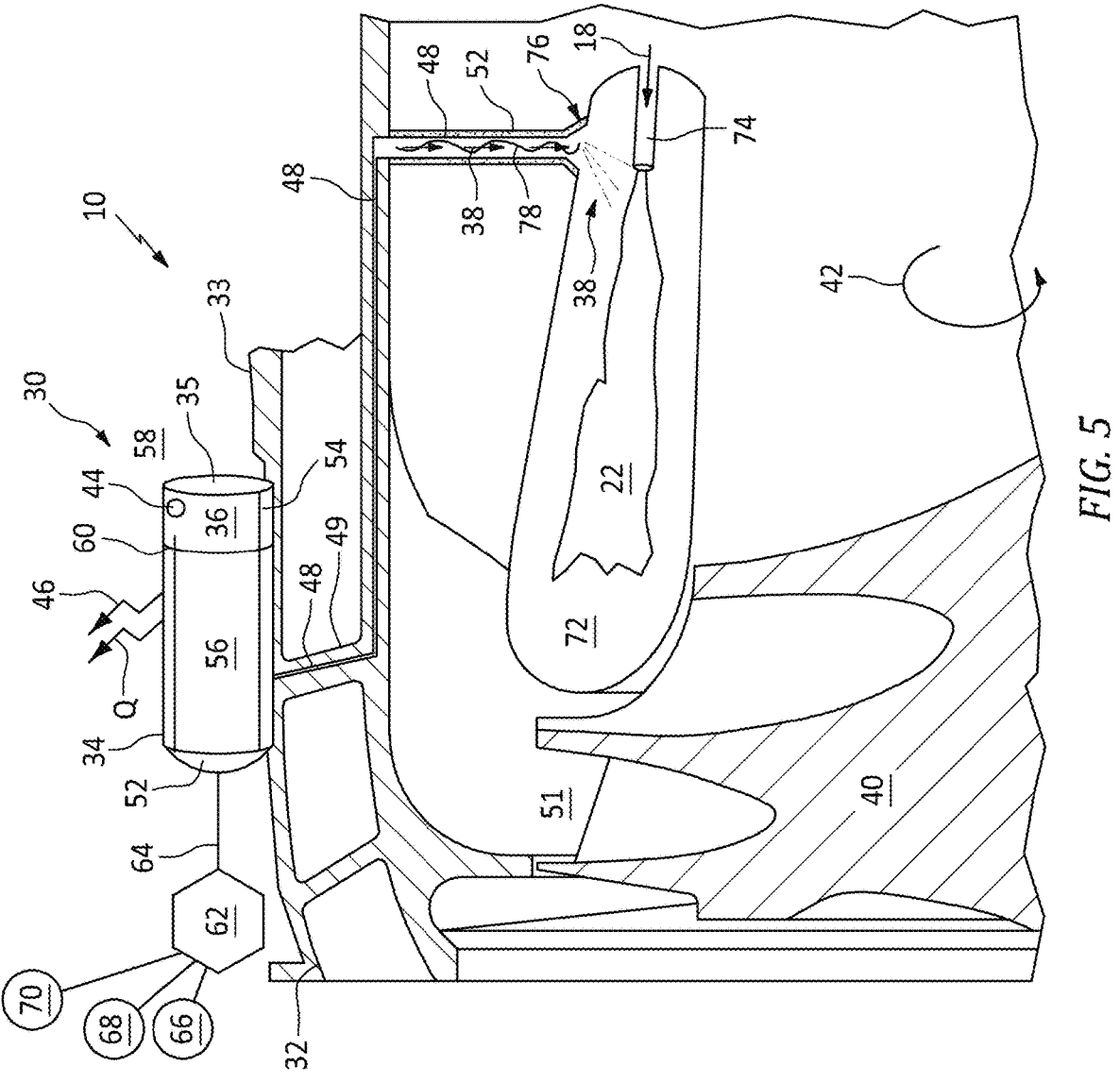
FIG. 5 is a partial cross sectional view schematic representation of an exemplary gas turbine engine with exemplary start mechanism.

Referring also to FIG. 3, FIG. 4 and FIG. 5 the exemplary gas turbine engine 10 with exemplary start mechanism 30 is shown. The start mechanism 30 is shown in operative communication with a case 32 of the gas turbine engine 10. There can be multiple start mechanisms 30. It is contemplated that the start mechanism 30, or a portion of the start mechanism 30, can also be located in other sections of the gas turbine engine 10, such as within cavities formed within the case 32, at an exterior surface 33 of the case and the like. The start mechanism may include a means to spool up the rotor 26, and a means to ignite mixture of fuel 18 and air 16.

The start mechanism 30 can include a receptacle 34. The receptacle 34 is configured to structurally contain a portable source of energy 35. The portable source of energy 35 can contain both electrical energy 46 and a source of chemical energy 36. The receptacle 34 is also configured to deliver converted chemical energy 38 to a rotor 40 of the gas turbine engine 10 for conversion of the converted chemical energy 38 into rotary mechanical energy 42 of the rotor 40. The rotary mechanical energy 42 can be employed to start the gas turbine engine 10. The receptacle 34 is also configured to deliver converted chemical energy 38 to the combustion section 20 for ignition. The converted chemical energy 38 can be in a form of an ignition fluid (for example, an ignition flame) to ignite a fuel 18 and air 16 mixture.

The source of chemical energy 36 can include a chemical or chemicals that when initiated can produce the converted chemical energy 38, such as a high temperature ignition fluid, or a rapidly expanding fluid. The converted chemical energy 38 can include a gas under high pressure, such as, for example, from about 1200 pounds per square inch to about 1800 pounds per square inch. In an exemplary embodiment, the high pressure gas can be approximately 1500 pounds per square inch. The converted chemical energy 38 can be at temperatures of less than 2200 degrees Fahrenheit but higher than 400 degrees Fahrenheit, sufficient to ignite combustion of the mixture of fuel 18 and air 16 at altitude. It is desirable for generating rotary mechanical energy 42 to have high velocity fluid and for an igniter, high temperature fluid is desirable at more moderate velocity.

The source of chemical energy 36 can be initiated in a number of ways such as by being overheated, crushed, penetrated to expose air to the source of chemical energy 36, overcharged electrically, internally shorted, by mixing multiple chemicals, by exposing the chemicals to flame from a fuse, a wick, a match, and the like. Abuse methods range from using a projective-type puncture, crushing, wedge-shaped penetration, and thermal exposure. Each method can produce different gas generation rates. The converted chemical energy 38 can be generated by rapid creation of thermal energy with subsequent temperature rise in the chemicals and an increased reaction rate that repeats until exhaustion of the chemical energy 36.

In an exemplary embodiment, the source of chemical energy 36 can include a battery 44 or multiple batteries 44. The multiple batteries 44 can be packed into one or more battery packages. The battery 44 can be selected from a diverse group of battery chemistries. In an exemplary embodiment the battery 44 can be a lithium ion battery. Different battery 44 chemistries can be explored, such as, Lithium-Titanate (LTO) and Lithium nickel manganese cobalt oxide (NMC), which may be capable of generating a substantial amount of gas or combustion. Additionally, lithium-cobalt oxide (LCO) batteries have a tendency towards thermal runaway to cause combustion for ignition. The benefit of batteries is they can be kept in a discharged state for storage and charged quickly for application. The battery 44 chemistry can include but not be limited to lithium cobalt oxide (LCO), nickel manganese cobalt (NMC), LCO/NMC, lithium iron phosphate (LFP), lithium manganese oxide (LMO), lithium titanate oxide (LTO), LTO-NMC, nickel cobalt aluminum (NCA), NMC, NMC/LMO, Solid state and the like. The battery 44 can be packaged in the form of a button, a cylinder, a pouch, prismatic form, laptop pack, modules, Electric Vehicle (EV) modules, EV pack and the like. Safety means can be included in the battery 44 package, such as compartmented chemicals to ensure controlled battery 44 chemical reaction (to generate gases or to combust, to avoid battery 44 explosion).

The battery 44 can provide both electrical energy 46 and converted chemical energy 38. The battery 44 can support electrical needs of the gas turbine engine 10 prior to being expended as converted chemical energy 38 for engine start. For example, the battery 44 can provide stored electrical energy 46 for use to electrically spin a generator 47 on a cold start of the gas turbine engine 10. In this mode the generator 47 is operated as a motor to spool up the rotor 40.

The receptacle 34 can be fluidly coupled to a flow channel 48. The flow channel 48 can be located within a portion 49 of the case 32 such as a strut, guide vane and the like. There can be a single flow channel 48 or multiple flow channel(s) 48. The flow channel 48 can be fluidly coupled with a nozzle 50. The nozzle 50 can be configured to direct the rapidly expanding high pressure converted chemical energy 38 toward the rotor 40 or combustion section 20. In an exemplary embodiment, the nozzle 50 can direct the expanding fluid toward the turbine rotor 26 into a turbine flow path 51. The flow channel 48 directed toward the combustion section 20 can include means (such as a diffusion opening/diffuser) incorporated to reduce ignition fluid 38 velocity to facilitate ignition.

The receptacle 34 as well as the flow channel 48 can include insulation 52 configured to manage thermal energy Q transfer as well as prevent electrical losses/leakage. The insulation 52 can be configured to protect the source of chemical energy 36 from unwanted heat. The insulation 52 can be configured to manage exothermal reactions of the source of chemical energy 36 and the converted chemical energy 38.

The receptacle 34 and the flow channel 48 can include a shell layer/coating 54. The coating 54 can be configured to provide a resistive barrier between a receptacle interior 56 and a receptacle exterior 58. The coating 54 can also serve to provide a pressure barrier, thermal barrier and chemical barrier, electrical barrier and the like.

A burst disk 60 structure can be formed within the interior 56. The burst disk 60 can be employed during the initiation of the stored chemical energy 36. The burst disk 60 can allow for the converted chemical energy 38 to flow or flame from the receptacle 34 to the flow channel 48 and nozzle 50. In an exemplary embodiment, the burst disk 60 can include a material that can change phase responsive to thermal energy exposure. A wax can be employed as a burst disk 60.

The receptacle 34 can be configured to ensure a thermal runaway event is timely such that the exothermic chemical decomposition of the source of chemical energy 36 stored within the receptacle 34 is accelerated by confinement to an enclosed space.

The receptacle 34 can be formed integral with the case 32 or combustion section 20, such as by additive manufacturing techniques.

The start mechanism 30 can include a control system 62. The control system 62 may include hardware, firmware, and/or software components that are configured to perform the functions disclosed herein, including the functions of the start mechanism 30. While not specifically shown, the control system 62 may include other computing devices (e.g., servers, mobile computing devices, etc.) and computer aided manufacturer (CAM) systems which may be in communication with each other and/or the control system 62 via a communication network 64 to perform one or more of the disclosed functions. The control system 62 may include at least one processor 66 (e.g., a controller, microprocessor, microcontroller, digital signal processor, etc.), memory 68, and an input/output (I/O) subsystem 70. The control system 62 may be embodied as any type of computing device e.g., a server, an enterprise computer system, a network of computers, a combination of computers and other electronic devices, or other electronic devices. Although not specifically shown, the I/O subsystem 70 typically includes, for example, an I/O controller, a memory controller, and one or more I/O ports. The processor 66 and the I/O subsystem 70 are communicatively coupled to the memory 68. The memory 68 may be embodied as any type of computer memory device (e.g., volatile memory such as various forms of random access memory).

The receptacle 34 is also configured to deliver converted chemical energy 38 to a combustor 72 within the combustion section 20 of the gas turbine engine 10 to ignite fuel 18 and air 16 in the combustor 72 to produce the combustion products 22. The flow channel 48 can be fluidly coupled with the combustor 72 through a nozzle/diffuser 76. The nozzle/diffuser 76 can be configured to direct the rapidly expanding high temperature converted chemical energy 38 near a fuel burner 74 in the combustor 72. The converted chemical energy 38 can be at a temperature sufficient to ignite the fuel 18/air 16. The nozzle/diffuser 76 can be configured to direct the ignition fluid 38 to the combustor 72, such as a diffusion opening to reduce ignition fluid 38 velocity to facilitate ignition.

In an exemplary embodiment, the rotor 40 can be spooled and the combustor 72 can be ignited by use of the converted chemical energy 38 from the receptacle 34.

It is contemplated that a separate receptacle 34 can include a portable source of energy 35, such as a dedicated battery solely for use in ignition of the fuel 18 and air 16 in the combustor 72. This receptacle 34 can be located adjacent to and/or integral with the combustor 72 and sacrificed. The dedicated battery can be sized to generate sufficient converted chemical energy 38 to ignite the fuel 18 and air 16.

It is contemplated that a fuse, wick, match or the like 78 can be located within the flow channel 48 and configured to initiate a flame for ignition of the fuel 18 in the combustor 72.

A fluid control device 80 can be fluidly coupled in the flow channel 48 between the receptacle 34 and the combustion section 20. The fluid control device 80, as seen in FIG. 4, can control the flow of the converted chemical energy 38 to the combustion section 20. The fluid control device 80 can delay the flow of the converted chemical energy 38 to the combustion section 20 to allow for a predetermined time to pass in order to ensure the rotor 40 is spooled before ignition. The fluid control device 80 can control the flow rate of the converted chemical energy 38 flowing to either the combustor 72 or the rotor 40. The fluid control device 80 can include a valve, an orifice, and the like.

The low velocity, high temperature ignition fluid 38 for igniting the fuel 18/air 16 mixture can pass through the flow channel 48 equipped with thermal insulation 52 along the ignition fluid path. The battery 44 can be sacrificial and in proximity to the combustor 72. The battery 44 can power the permanent magnetic generator 47 and other electrical components.

The battery 44 can be configured as a smaller battery pack, electrically connected with a bigger battery pack. The small battery pack can be sized with a range of 1-50 Watt-hour when the battery 44 is being used as an igniter. The big battery pack can be sized 10×-50× Watt-hour of the small battery.

The small battery pack can be in close proximity to combustor 72. In an example scenario, the small battery pack can run in parallel with the big battery pack to drive generator 47 to spool up the rotor 40. The small battery pack can overheat triggering thermal overrun to generate the converted chemical energy (ignition fluid) 38 to ignite the fuel 18 and air 16 in the combustor 72. The ignition fluid 38 is channeled to the combustor 72 to start combustion of the mixture of fuel 18 and air 16. The big battery pack is intact and may be charged by the generator 47 for continued missions. The channel 48 may be thermally and/or electrically insulated with insulation 52, such as, a ceramic (or ceramic composite matrix) material. The fuse/wick/match 78 and the like may be placed in the channel 48 between the sacrificial battery 44 and the combustor 72.

A technical advantage of the disclosed start mechanism for propulsion systems includes a readily available energy source for the engine.

Another technical advantage of the disclosed start mechanism for propulsion systems includes a source for ignition in the combustion section.

Another technical advantage of the disclosed start mechanism for propulsion systems includes a device that minimizes the engine size for improved vehicle integration.

Another technical advantage of the disclosed start mechanism for propulsion systems includes a battery starter pack easily integrated into the engine structure.

There has been provided a start mechanism for small engines. While the start mechanism for small engines has been described in the context of specific embodiments thereof, other unforeseen alternatives, modifications, and variations may become apparent to those skilled in the art having read the foregoing description. The embodiments can be interchanged and combined. Accordingly, it is intended to embrace those alternatives, modifications, and variations which fall within the broad scope of the appended claims.

What is claimed is:

1. A start mechanism for a propulsion system comprising:
a receptacle;
at least one portable source of energy disposed within the receptacle, wherein the at least one portable source of energy comprises a first battery pack proximate the combustor, the first battery pack configured to ignite a fuel in a combustor; and a second battery pack coupled with a motor-generator, wherein the second battery pack is sized from 10 to 50 times the Watt-hours of the first battery pack;
a flow channel fluidly coupled to the receptacle; and a combustion section comprising the combustor within a case, the combustion section fluidly coupled to the flow channel; wherein the at least one portable source of energy is configured to produce at least one of electrical energy and a source of chemical energy.

2. The start mechanism for a propulsion system according to claim 1, wherein at least one of the first battery pack and the second battery pack is selected from the group comprising lithium cobalt oxide (LCO), nickel manganese cobalt (NMC), LCO/NMC, lithium iron phosphate (LFP), lithium manganese oxide (LMO), lithium titanate oxide (LTO), LTO-NMC, nickel cobalt aluminum (NCA), NMC/LMO, and combinations thereof.

3. The start mechanism for a propulsion system according to claim 1, wherein the at least one portable source of energy is configured to produce a converted chemical energy after initiation of the at least one portable source of energy.

4. The start mechanism for a propulsion system according to claim 3, wherein the converted chemical energy comprises an ignition fluid.

5. The start mechanism for a propulsion system according to claim 1, wherein the at least one portable source of energy is configured to be initiated by at least one of being overheated, crushed, penetrated to expose air to the source of chemical energy, overcharged electrically, internally shorted, mixed with multiple chemicals and combinations thereof.

6. The start mechanism for a propulsion system according to claim 1, wherein the flow channel is insulated.

7. A gas turbine engine having a start mechanism comprising:
a case supporting a combustion section having a combustor;
a receptacle in operative communication with the combustor;
at least one battery disposed within the receptacle;
a flow channel fluidly coupled to the receptacle; the combustor fluidly coupled to the flow channel; wherein the at least one battery is configured to produce at least one of electrical energy and a source of chemical energy, wherein the flow channel is fluidly coupled with a diffuser; wherein the source of chemical energy is configured to produce a converted chemical energy after initiation of the chemical energy, wherein the converted chemical energy comprises an ignition fluid and the diffuser is configured to direct the ignition fluid toward a burner in the combustor.

8. The gas turbine engine having the start mechanism according to claim 7,
wherein the at least one battery pack comprises a first battery pack proximate the combustor, the first battery pack configured to ignite a fuel in the combustor; and
a second battery pack coupled with a motor-generator, wherein the second battery pack is sized from 10 to 50 times the Watt-hours of the first battery pack.

9. The gas turbine engine having the start mechanism according to claim 7, wherein the flow channel comprises at least one of a fuse, a wick and a match configured to ignite a fuel and air in the combustor.

10. The gas turbine engine having the start mechanism according to claim 7, wherein the flow channel comprises insulation, the insulation configured to manage thermal energy transfer.

11. The gas turbine engine having the start mechanism according to claim 7, further comprising:
a motor-generator in operative communication with the at least one battery, wherein the at least one battery contains stored electrical energy for use to electrically spin the motor-generator to spool up a rotor of the gas turbine engine.

12. A process of forming a gas turbine engine having a start mechanism comprising:

forming a case supporting a combustion section having a combustor;

forming a receptacle in operative communication with the combustor;

disposing at least one battery within the receptacle;

forming a flow channel fluidly coupled to the receptacle;

fluidly coupling the combustion section to the flow channel; configuring the at least one battery to produce at least one of electrical energy and a source of chemical energy; and configuring the source of chemical energy to produce a converted chemical energy after initiation of the chemical energy, wherein the converted chemical energy comprises an ignition fluid;

coupling a motor-generator in operative communication with the at least one battery, wherein the at least one battery contains stored electrical energy for use to electrically spin the motor-generator to spool up a rotor of the gas turbine engine.

13. The process of claim 12, further comprising:

forming a shell layer with the receptacle;

configuring the shell layer to provide a resistive barrier between a receptacle interior and a receptacle exterior; and configuring the shell layer to provide at least one of a pressure barrier, a thermal barrier, an electrical barrier and a chemical barrier and combinations thereof.

14. The process of claim 12, further comprising:

wherein the flow channel comprises insulation; and configuring the insulation to manage thermal energy transfer.

15. The process of claim 12, wherein the at least one battery comprises a first battery pack and a second battery pack;

coupling the first battery pack proximate the combustor, the first battery pack configured to ignite a fuel in the combustor; and coupling the second battery pack with a motor-generator, wherein the second battery pack is sized from 10 to 50 times the Watt-hours of the first battery pack.

16. The process of claim 12, further comprising:

fluidly coupling the flow channel with a diffuser; and configuring the diffuser to direct the ignition fluid toward the combustor.

17. The process of claim 12, wherein the at least one battery is selected from the group comprising lithium cobalt oxide (LCO), nickel manganese cobalt (NMC), LCO/NMC, lithium iron phosphate (LFP), lithium manganese oxide (LMO), lithium titanate oxide (LTO), LTO-NMC, nickel cobalt aluminum (NCA), NMC/LMO, and combinations thereof.

18. A process of forming a gas turbine engine having a start mechanism comprising:

forming a case supporting a combustion section having a combustor;

forming a receptacle in operative communication with the combustor;

disposing at least one battery within the receptacle;

forming a flow channel fluidly coupled to the receptacle;

fluidly coupling the combustion section to the flow channel;

configuring the at least one battery to produce at least one of electrical energy and a source of chemical energy;

configuring the source of chemical energy to produce a converted chemical energy after initiation of the chemical energy, wherein the converted chemical energy comprises an ignition fluid;

forming a shell layer with the receptacle;

configuring the shell layer to provide a resistive barrier between a receptacle interior and a receptacle exterior; and configuring the shell layer to provide at least one of a pressure barrier, a thermal barrier, an electrical barrier and a chemical barrier and combinations thereof.

19. A gas turbine engine having a start mechanism comprising:

a case supporting a combustion section having a combustor;

a receptacle in operative communication with the combustor;

at least one battery disposed within the receptacle; and a flow channel fluidly coupled to the receptacle; the combustor fluidly coupled to the flow channel, wherein the flow channel comprises at least one of a fuse, a wick and a match configured to ignite a fuel and air in the combustor; wherein the at least one battery is configured to produce at least one of electrical energy and a source of chemical energy; wherein the source of chemical energy is configured to produce a converted chemical energy after initiation of the chemical energy, wherein the converted chemical energy comprises an ignition fluid.

\* \* \* \* \*